US006452689B1

(12) United States Patent
Srinivasan

(10) Patent No.: US 6,452,689 B1
(45) Date of Patent: *Sep. 17, 2002

(54) DATA NETWORK BASED COPIER

(75) Inventor: Thiru Srinivasan, Highlands Ranch, CO (US)

(73) Assignee: Qwest Communications International, Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,898

(22) Filed: May 15, 1998

(51) Int. Cl.$^7$ ............................................... G06F 15/00
(52) U.S. Cl. ...................... 358/1.15; 358/1.13; 707/513
(58) Field of Search ............................... 358/1.12, 1.13, 358/1.14, 1.15, 1.16, 296, 1.1, 404, 407; 707/500, 501, 513

(56) References Cited

U.S. PATENT DOCUMENTS

| | | | |
|---|---|---|---|
| 4,106,060 A | | 8/1978 | Chapman .................... 358/402 |
| 4,414,579 A | | 11/1983 | Dattilo et al. ............... 358/467 |
| 5,604,788 A | | 2/1997 | Tett ............................. 455/412 |
| 5,680,580 A | | 10/1997 | Beardsley et al. ............. 714/6 |
| 5,684,965 A | | 11/1997 | Pickering ..................... 705/34 |
| 5,721,826 A | * | 2/1998 | Gerson et al. .......... 395/200.43 |
| 5,930,810 A | * | 7/1999 | Farros et al. ................ 707/506 |
| 5,956,698 A | * | 9/1999 | Lacheze et al. ................ 705/34 |
| 5,978,559 A | * | 11/1999 | Quinion ...................... 358/1.15 |
| 5,978,560 A | * | 11/1999 | Tan et al. .................... 358/1.15 |

OTHER PUBLICATIONS

DocuPrint 4512 Network Laser Printer; Mar. 25, 1998; pp. 1–3; http://www.xerox.com/print/news/n961028b.html.
Xerox Document Centre 230 Digital Copier; Mar. 24, 1998; pp. 1–3 and pp. 1–4;; http://www.xerox.com/Products/XDC/230broc.html and http://www.xerox.com/Products/SDC/230spec.html.
Xerox Document Centre 220 Digital Copier; Mar. 24, 1998; pp. 1–3; and pp. 1–4; http://www.xerox.com/Products/XDC/220broc.html and http://www.xerox.com/Products/SDC/220spec.html.

* cited by examiner

Primary Examiner—Mark Wallerson
(74) Attorney, Agent, or Firm—Marsh Fischmann & Breyfogle LLP

(57) ABSTRACT

A network based copier allows customers who have access to a data network to submit electronic documents to be copied. Users of the network access a web page and submit a electronic document as well as other customer related information. Once this information has been input onto the web page, a processor verifies methods of payment and organizes details necessary for completion of the job. The electronic document is then placed in the queue manager. When the electronic document is first in the queue any necessary changes are made to the copier and the document is copied. Once the copies are completed, notifications are provided to the copier attendant and the customer, and the customer is automatically billed for the copies.

44 Claims, 3 Drawing Sheets

DATA NETWORK BASED COPIER

FIELD OF THE INVENTION

This invention relates to a substantially automated copier system and more specifically to a copier system which copies electronic documents submitted through a data network.

BACKGROUND OF THE INVENTION

There are many copier businesses in existence which provide a variety of copy services for their customers. In the most common situation, a customer physically carries a document into the copier's business location and either pays to use a free standing copier or gives the document to an operator who then takes it to a copier and has the job performed. A customer can also bring in an electronic version of the document on a floppy disk, print it out on one of the computer printers at the copy business, and then have copies made.

In more recent times, some copier businesses provide e-mail facility to their select customers. In this case, the customer calls the business before sending the e-mail. The document to be printed is then sent with the e-mail as an attachment. Only after speaking to the customer service representative and giving specific copying instructions, will the job will be accepted. The copier attendant prints out an original of the document on a laser printer. This printing step may entail an extra charge. The attendant then physically carries the original version from the printer to the copier and carries out the copy job. Upon completion of the copy job, the attendant either through e-mail or phone informs the customer that the copy is ready. At this point the customer can either come in and pick up the copied documents or have them otherwise sent to him/her. With this e-mail copy service, methods of payment must also be worked out between the copy business and the customer.

Drawbacks of the above system are obvious. Depending on the location of the copy business, the act of physically transporting the document to be copied is time intensive. With the transmission of e-mail, there is time spent on the phone giving the copy instructions to the attendant. With this type of exchange, there is a significant chance of human error in the relaying of instructions, as well as the expense for printing out originals. With both types of prior art copying methods, there is a significant amount of manual labor performed by the copier attendant. Also, additional human error is possible with a manual billing procedure.

SUMMARY OF THE INVENTION

Described herein is a system for submitting electronic documents to be copied over a data network. As part of the data network, a location is provided where users can submit an electronic document to be copied along with customer information. Once this data is received, the processor transmits the electronic document to the copier. The copier receives, processes, and copies the electronic document.

In one aspect of the invention, the location for submitting electronic documents and processing information is a web page on the Internet/intranet. The customer submits the electronic document as well as customer information which may include personal information, methods of payment and special instructions for making the copies. A processor then downloads and begins processing the information. Connected to the processor is a financial systems interface which the processor may use to access an external billing service. Through this connection, the processor may verify credit card numbers, make charges against known accounts, or perform any other billing functions.

Once the payment for the copies has been confirmed, the electronic document is submitted to a queue manager in the processor. The processor includes at least one queue manager where the electronic document is held until it is copied. Once the electronic document is in the queue manager, the processor may calculate the length of time until the copies are done, the cost of copies, and any other items which would be of interest to the customer. The customer receives a tracking number through a notification system so that queries can be made as to the status of the copying process.

The customer can receive a variety of messages through the notification system about the status of the copying process. The notification system is accessed by the processor through a telephonic interface. Once contacted by the processor, the notification system may provide messages to the customer in the form of an E-mail, a page, a phone call, etc . . .

Once the electronic document reaches the top of the queue, notification is provided to a copier attendant at the copier business. This notification may include any special instructions necessary to make the proper adjustments to the copier. The copier is configured such that it has all the necessary capabilities to automatically make copies of an electronic document which is received in a word processing format. Once the copier has been adjusted, the electronic document is transmitted from the queue manager to the copier where it is then copied. Upon completion, the processor notifies the attendant. At this time any post copying instructions are provided. Once the job is completed, the attendant may update the status through the user interface. Any final billing procedures are then completed. The processor then provides notification to the customer that the copies are completed.

In another aspect of the invention, customers may still go to the copy business and provide the documents to the attendant in the word processing format, such as a floppy disk. The copier attendant can download the file through the user interface and put it into the queue with other electronic documents which have been received through the data network. Notifications that the copies are completed can be sent to the customer upon completion in the same manner as if the document had been submitted through the data network.

DETAILED DESCRIPTION

Figure 1:
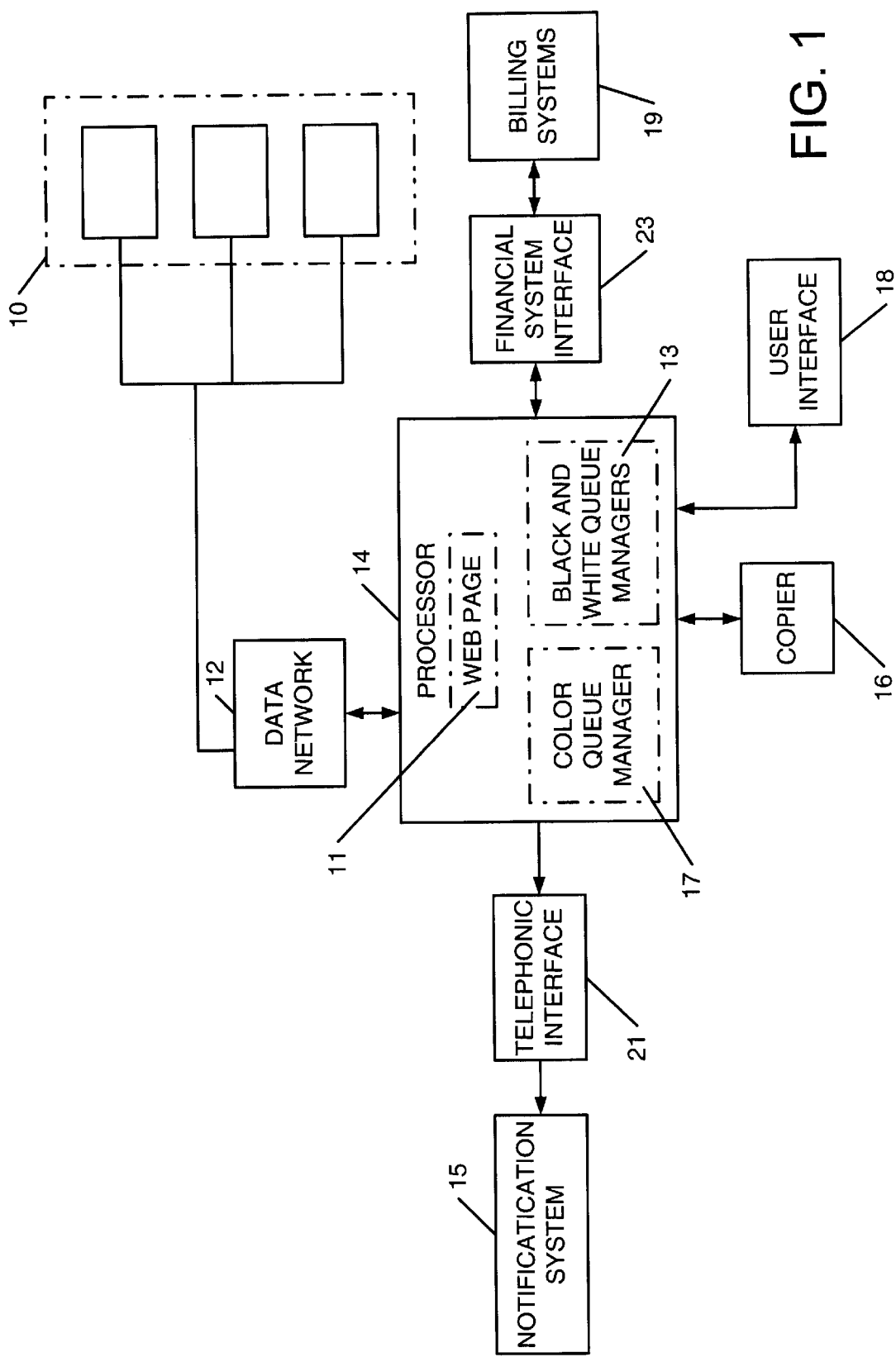
FIG. 1 is a system diagram for the data network copier.

Shown in FIG. 1 is a system diagram for a data network based copier. The data network 12 can be any other sort of computer linked network, such as the Internet or an intranet system. In the system shown in FIG. 1, the input nodes 10 represent the users of the data network. These users can be anything from PC's in homes logged onto the Internet, to computers at work attached to a local area network. Also on the network is the job processor 14. This processor receives and processes instructions transmitted by the users. The processor may be a UNIX server, a personal computer, or any similar device. Included within the processor 14 are black and white queue manager 13 and color queue manager 17. These queues hold all the electronic documents which have been submitted to be copied. The black white queue manager 13 holds all the black and white documents submitted by the customers, and the color queue manager 17 holds all documents which require color copying. Each queue manager may handle one or more copiers. The processor may query the queue managers and generate status information about the various electronic documents to be copied. The status information may include costs for copying, length of time till copies are complete, problems encountered during the copying, when copying is completed, and how copies can be delivered.

A number of connections are established from the job processor 14. One connection is made to copier 16. This copier has been loaded with a plurality of print drivers (MS WORD, MS EXCEL, WORDPERFECT, ACROBAT, etc.) to print/copy any type of file. In one embodiment of the invention the copier is a high speed network printer which provides copier functions such as two sided printing and collating. This copier/printer is configured such that the electronic document to be copied has to be transmitted only once, regardless of the number of the copies. This machine may also serve as a stand alone copier in which copy jobs are manually fed. A number of copier/printer products manufactured by the Xerox corporation provide the functionality of the copier 16 described herein.

Another connection is made to a telephonic interface 21. This interface provides a connection over telephone lines to a notification system 15. During the copying process, there may be times when messages containing status information are sent to the customer. The telephonic interface provides connections to a number of notification systems which may be used to send messages. If the customer provides a pager number when submitting the copy order, the processor through the telephonic interface may contact the paging service and provide the customer a numeric or alphanumeric message. The telephonic interface may also provide access to an external E-mail provider. With this type of notification system, the telephonic interface provides a connection to an Internet service provider. An E-mail message is transmitted from the processor, through the provider to the customer. The telephonic interface may also provide a connection to a telephone switchboard from which phone calls are made to the customer. The processor generates the message to be given to the customer, and a telephone operator makes the call and delivers the message. One skilled in the art would realize that the interface 21 may be used to establish contact with any number of notification systems.

Another connection from the processor is made to financial systems interface 23. This interface provides a connection to billing system 19. The billing system 19 may comprise one of the credit card services which can be accessed over the phone lines and verifies credit card information. The credit card service also authorizes charges made against a particular account. The financial systems interface 23 may also access non-credit card accounts which were established by the customer and the copier business to pay for copies. These accounts may have limited access, so the processor, through the financial systems interface, accesses the account, confirms that the customer has authorization, and debits the account for the copies. Described above are two automated payment schemes which could be implemented alone or in combination. The financial systems interface is designed to allow the processor to access many different types of systems. One skilled in the art would realize that any number of payment systems could be implemented with the system described herein.

The final connection is made to user interface 18. In an embodiment of the invention, this interface is located at the copier business, preferably in close proximity to the copier. This interface is used by the copier attendant. Through this interface the processor provides notifications of the receipt of documents, document status in the queue, and information about particular details of the copies that the attendant must be aware of. The interface also notifies the attendant of the completion of the copying process. This interface can take on a variety of different forms. It may be a pager and data input combination, a touch screen computer monitor, a personal computer with keyboard and monitor, or any other two way interface device. This interface may also include the functionality to download electronic documents to the processor.

The data network copier provides a substantially automated process for copying electronic documents submitted from a remote site. To begin, a customer accesses a secured location, web page 11, established on the job processor 14. At this web page, the electronic document to be copied, as well as customer information are submitted. The customer information may include things such as size, number of copies and color of the paper to be used for the copies. Also included may be the method of payment for the job. Some examples of method of payment maybe authorizing payment by credit card, or charges against a particular account. The financial systems interface 23 provides access to a billing system that provides verification and makes charges against the designated accounts.

Once the customer information has been processed, the electronic document to be copied is placed in queue manager 13 or 17. After placement, the processor can calculate, based on the position of the electronic document in the queue, the length of time before the job is completed. All the payment and status information for the job may be provided back to the customer through the notification system at any time. When the copy job reaches the front of the queue, information is provided to the attendant through the user interface as to any special procedures that need to be performed in order to output the copies. Once any adjustments are made, the attendant activates the copier and the job is performed. When the job is completed, notifications can be provided by the processor to both the customer and the attendant. This notification can include how the copied documents will be sent to the customer and it can also instruct the copier/ operator on various other tasks which may need to be performed on the copies, such as binding. Once the job is complete, the processor through the financial systems interface, automatically completes any necessary billing procedures.

Figure 2A:
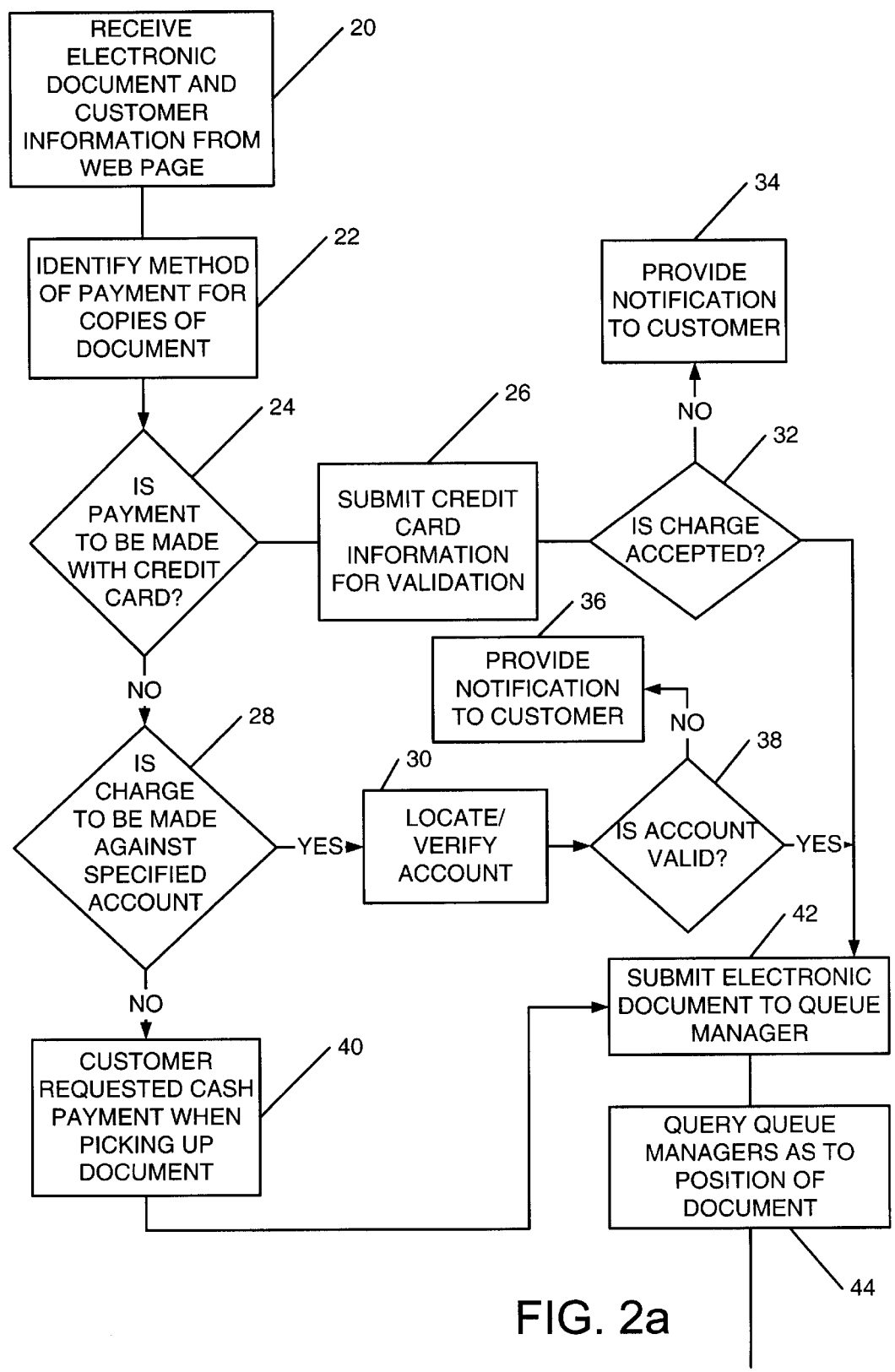
FIGS. 2a and 2b disclose a flow chart which describes in detail the operation of the data network copier.
Figure 2B:
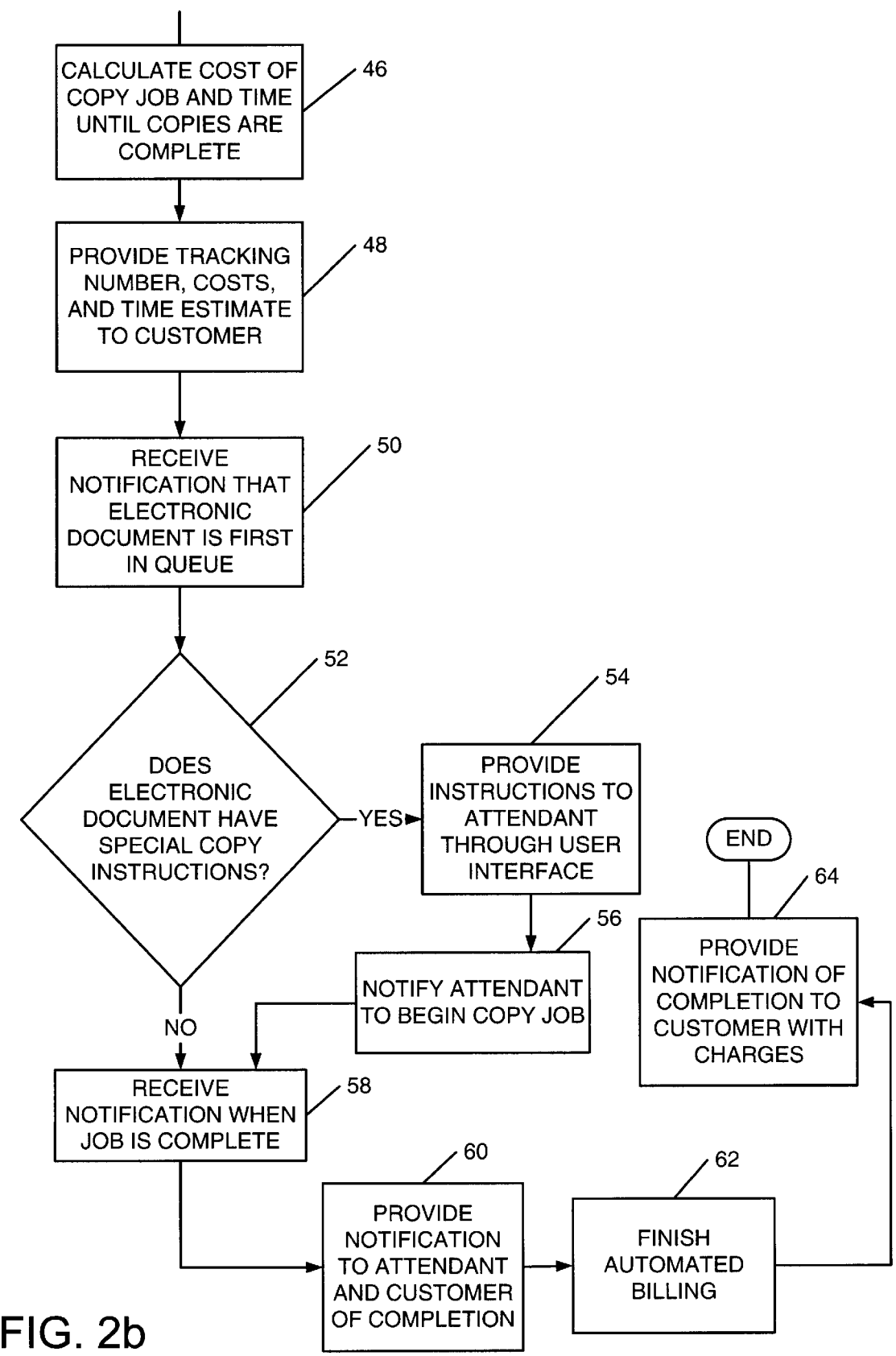

A more detailed description of the copier system operation is provided in the flow chart of FIG. 2. This flow chart is described in terms of the steps performed by the processor 14 in operating the network copier system. As was described above, the customer provides the electronic document and related customer information through a specially designed web page 11. There are detailed instructions on the web page for submitting the data. The customer information may include both personal and financial information, as well as specific instructions on how the copies are to be made. The personal information may include:

name of customer;

customer's address; and customer's telephone number for job completion notification;

customer's e-mail address for job completion notification; or customer's pager number for customer completion notification.

The financial information may include:

type of credit card, credit card number, and credit card date of expiration; departmental charge code; or cash payment.

The specific instructions for making the copies may include:
- file type;
- file name;
- number of copies
- use color copier (yes/no);
- page size;
- single sided or double sided copy;
- three hole punch paper;
- binder;
- binder color;
- type of binder.

The processor receives this information from the web page at step 20. The data is processed and a projected cost is calculated at step 22 and the query is made at step 24 as to whether a credit card is being used to make the payment. If a credit card is to be used, at step 26 the credit card is submitted through the financial systems interface to the billing system for validation. At step 32, a query is made as to whether the charges have been accepted. If they are, the processor continues processing the copy request. If the charges are not accepted, notification is provided to the customer as to why the copy request has been denied.

If payment is not to be made with a credit card, the query is made at step 28 as to whether the charges are to be made against a specific account. If they are, at step 30 the financial system locates the account and at step 38 confirms that the customer is authorized to charge against it. If the customer is not authorized, notification is provided to this effect. If authorization is given, the processor continues with the copy request. If cash payment is required by customer at step 40, the processor continues with the copy request.

Once payment is authorized to make copies, the processor submits the electronic document to the queue manager at step 42. The "COPY JOB" message sent from the processor to the appropriate queue would, through a message header, indicates a tracking number, the type of document (MS-WORD, MS-EXCEL, VISIO, Word Perfect, Post Script, etc.), paper size (8 ½×11, 11×14, etc . . . ), single or double sided, and number of copies requested. The Copier uses the appropriate print driver to decode the document sent over the data network. It is possible that the copier may have a limit on the number of trays it has to receive the copies. In this case, the processor may split the copy job into smaller jobs, and submit them to the queue manager. At step 44, the processor queries the queue managers as to the position of the electronic document in the queue, as well as information about other jobs previously submitted. At step 46, the processor calculates an estimated time of completion. Through the use of the appropriate formula, the system can calculate an approximate wait time based on the following factors: number of jobs in the queue, total job size, number of copies, mean copier speed, and average time for an attendant to make a copy ready, average manual processing time, including loading and clearing paper trays, clearing up jams, etc. The tracking number may be used by the customer to track the status of the job through queries submitted through web page 11 or directly to the copy business. All this information is provided to the customer at step 48.

When the electronic document reaches the top of the queue manager, a notification is provided to the processor at step 50. This notification is in the form of a "READY" message sent from the queue manager indicating the availability of the copier to accept a new job, if any, for copying. The processor may then page or otherwise notify the attendant, indicating the copier ID that is ready to accept the job. A query is then made at step 52 as to whether electronic document has special copying instructions (3-punch hole paper, paper size, etc.) associated with it which would require changes to the default set up of the copier. At step 54, the attendant would then check the availability of papers in the trays of the copier against the specific instructions presented on the user interface before pressing a button on the user interface and starting the copying process. Otherwise, the copy job is started automatically without attendant intervention.

During the copying process the copier may transmit a number of messages to the processor which may be passed on to the attendant. These messages may include: "OUT OF PAPER" which triggers a page (the copier ID will appear in the pager) requesting the Attendant's help, "TRAY FULL" (a copier may only be able to handle a certain number of pages) which triggers a page (copier ID will be displayed) requesting the Attendant's help, and "PAPER JAM" which indicates a problem feeding sheets into the copier which triggers a page (copier ID will be displayed) requesting the attendant's help.

When the copying is complete the processor receives a "JOB COMPLETED" message from the copier at step 58. This indicates the completion of the copying. The processor uses this message to page the attendant (with the copier ID and the tracking number included) at step 60, who then clears the trays and make the copier ready for the next job. The processor also provides any additional instruction as to post copying tasks which need to be performed. The post copying tasks may include how the copies are to be bound or similar information. The processor may then alert the attendant to the next job in the queue.

After all tasks are complete, the processor receives a complete indication from the attendant that the copying and post copying processes are complete. At step 62, the final billing processes are completed. At step 64, the customer is notified completion and actual charges, and information can be provided to the customer as to how the copies can be picked up or delivered. The processor may provide the capability for the customer to review the charges on the web page for a specified time period after the completion of the job.

The present system has the flexibility to allow users to submit electronic documents through the data network or to deliver an electronic document in person. If a user has a particular document on a floppy disk, they can bring it into the copy business and give it to the attendant. At this point, the attendant, through the user interface, downloads the electronic document from the disk to the job processor 14. The attendant can also enter any automatic billing or format information through the interface. The job processor then puts the electronic document in the appropriate queue manager along with any other electronic documents which either have been received through the web page or from the attendant. From this point on the copying process is handled as was described previously.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

I claim:

1. A data network based copier system, comprising:

a processing device in connection with the Internet, wherein the processing device includes a web page which is accessible over the Internet and through which at least one electronic document and associated customer information may be entered, said processing device further comprising at least one queue manager for holding electronic documents received over the data network where the queue manager is remotely accessible over the Internet by the customer to determine status of the at least one electronic document, and further configured to employ the associated customer information to generate at least one notification which is transmittable over a telephonic network outside the system to the customer wherein the at least one notification includes information relating to the status; and a copier in connection with the data network and in communication with the processing device, which is configured to receive the at least one electronic document and the associated customer information from the processing device and to generate copies of the at least one electronic document as specified in the customer information.

2. The data network based copier system of claim 1, wherein the processing device provides status information.

3. The data network based copier system of claim 2 wherein the status information may include costs for copying, length of time till the copies are complete, problems encountered during the copying, when the copying is completed, and how the copies can be delivered.

4. The data network based copier system of claim 2 further including a user interface connectable to the processing device which displays the status information and the customer information.

5. The data network based copier system of claim 1 wherein the customer information may include personal information.

6. The data network based copier system of claim 5 wherein the personal information may include name of customer, the customer's address, the customer's telephone number for job completion notification, the customer's e-mail address for job completion notification, the customer's pager number for customer completion notification.

7. The data network based copier system of claim 1 wherein the customer information may include financial information.

8. The data network based copier system of claim 7 wherein the financial information may include type of credit card, the credit card number, the credit card date of expiration, and the departmental charge code.

9. The data network based copier system of claim 1, wherein the customer information may include instructions on how the at least one electronic document is to be copied.

10. The data network based copier system of claim 9, wherein the instruction on how the at least one electronic document to be copied may include file type, the file name, use of color copier, page size, single sided or double sided copy, use of three hole punch paper, use of binder, the binder color and type of the binder.

11. The data network based copier system of claim 1 wherein the at least one electronic document is in a word processing format.

12. The data network based copier system of claim 2 further comprising a telephonic interface which transmits the notification from the processor to a notification system, and the notification system provides the notification to the customer.

13. The data network based copier system of claim 12 wherein the notification is transmitted over telephone lines.

14. The data network based copier system of claim 12 wherein the notification system electronically pages the customer.

15. The data network based copier system of claim 12 wherein the notification system transmits E-mail messages to the customer.

16. The data network based copier system of claim 12 wherein the notification system is a telephone switchboard where a telephone call is placed to the customer.

17. The data network based copier system of claim 1 further including a financial systems interface which provides a connection between the processor and a billing system.

18. The data network based copier system of claim 17 wherein the financial systems interface provides the connection over the telephone lines.

19. The data network based copier system of claim 17 wherein the billing system is a credit card service which verifies credit card information, and authorizes charges made against a particular account.

20. The data network based copier system of claim 17 wherein the billing system controls access and makes charges against accounts established by the customer with the copier business to pay for the copies.

21. The data network based copier system of claim 1 wherein the processing device is a personal computer attached to the Internet.

22. The data network based copier system of claim 1 wherein the processing device is a UNIX server connected to the Internet.

23. The data network based copier system of claim 1 wherein the at least one queue manager may provide the electronic documents for a plurality of the copiers.

24. The data network based copier system of claim 1 wherein the interface is a web page.

25. A method for copying at least one electronic document, comprising the steps of:

providing a web page which is accessible over the Internet, wherein the web page is configurable to receive at least one document from a customer as well as customer associated instructions for copying the document;

receiving the at least one electronic document and the associated customer information through the web page;

storing the at least one electronic document in a queue, and generating status information with regards to the at least one electronic document which is accessible over the Internet through the web page;

processing the at least one electronic document and the associated customer information received at the interface;

transmitting the electronic document to a network copier;

making copies of the electronic document according to the associated customer information; and generating at least one notification with regards to the step of making copies of the at least one electronic document and transmitting the notification to at least one remotely located party over a telephony network according the associated customer information, wherein the notification includes the status information.

26. The method of copying at least one electronic document of claim 25 wherein the status information may include costs for copying, length of time till the copies are complete, problems encountered during the copying, when the copying is completed, and how the copies can be delivered.

27. The method for copying at least one electronic document of claim 25 wherein the status information is provided to the customer through an electronic paging system.

28. The method for copying at least one electronic document of claim 25 wherein the status information is provided to the customer through an E-mail system.

29. The method for copying at least one electronic document of claim 25 wherein the status information is provided to the customer with a telephone call.

30. The method for copying at least one electronic document of claim 25 wherein the customer information may include personal information.

31. The method for copying at least one electronic document of claim 30 wherein the personal information may include name of customer, the customer's address, the customer's telephone number for job completion notification, the customer's e-mail address for job completion notification, the customer's pager number for customer completion notification.

32. The method for copying at least one electronic document of claim 25 wherein the customer information may include financial information.

33. The method for copying at least one electronic document of claim 32 wherein the financial information may include type of credit card, the credit card number, the credit card date of expiration, and the departmental charge code.

34. The method for copying at least one electronic document of claim 25, wherein the customer information may include instructions on how the at least one electronic document is to be copied.

35. The method for copying at least one electronic document of claim 34, wherein the instruction on how the electronic document to be copied may include file type, the file name, use of color copier, page size, single sided or double sided copy, use of three hole punch paper, use of binder, the binder color and type of the binder.

36. The method for copying at least one electronic document of claim 25 wherein the status information and the customer information are provided to an attendant of the network copier.

37. The method for copying at least one electronic document of claim 36 wherein the attendant makes adjustments to the copier based on the customer information.

38. The method for copying at least one electronic document of claim 25 further comprising the step of automatically billing a customer for the copies.

39. The method for copying at least one electronic document of claim 38 wherein the processing of automatically billing the customer includes determining charges based on any combination of a number pages in the electronic document, page size, charge per page, single sided or double sided, type of binder, and choice of color.

40. The method for copying at least one electronic document of claim 38 wherein the charges are made against a credit card account.

41. The method for copying at least one electronic document of claim 38 wherein the charges are made against an account established to pay for the copies.

42. The method for copying at least one electronic document claim 25 wherein the at least one electronic document is split into a plurality of the electronic documents if a page count exceeds a predetermined number.

43. The method for copying at least one electronic document of claim 25 wherein the at least one electronic document is submitted to the processor by the attendant through a user interface.

44. The method of claim 25 wherein the interface is a web page.

* * * * *